United States Patent
Allen

[15] 3,673,733
[45] July 4, 1972

[54] CONTROLLED ENVIRONMENT APPARATUS AND PROCESS FOR PLANT HUSBANDRY

[72] Inventor: Merton Allen, Schenectady, N.Y.
[73] Assignee: Environment/One Corporation, Latham, N.Y.
[22] Filed: Nov. 26, 1969
[21] Appl. No.: 880,126

[52] U.S. Cl. ................................47/58, 47/17, 165/47, 98/33, 240/51.11
[51] Int. Cl. ................................................A01g 9/14
[58] Field of Search ........................................47/1, 17–19; 98/33; 23/232, 253–256, 281; 240/51.11; 128/1, 188, 191, 204; 73/23, 421; 165/21, 60, 47

[56] References Cited

UNITED STATES PATENTS

| | | | |
|---|---|---|---|
| 3,383,179 | 5/1968 | Tibbitts | 23/281 |
| 3,434,530 | 3/1969 | Davis | 165/60 |
| 3,095,670 | 7/1963 | Raab | 47/17 |
| 1,827,530 | 10/1931 | Le Grand | 47/17 X |
| 3,063,195 | 11/1962 | Ravich | 47/17 |
| 3,108,399 | 10/1963 | Fraser | 47/17 |
| 3,124,903 | 3/1964 | Truhan | 47/17 |
| 3,348,922 | 10/1967 | Bose et al | 47/17 X |
| 3,398,481 | 8/1968 | Lake | 47/17 X |
| 3,478,817 | 11/1969 | Shaw | 165/21 |
| 3,529,379 | 9/1970 | Ware | 47/17 |

FOREIGN PATENTS OR APPLICATIONS 1,143,403  2/1969  Great Britain

OTHER PUBLICATIONS

Pureco Carbon Dioxide, Pure Carbonic Co., New York, N.Y.

*Primary Examiner*—Robert E. Bagwill
*Attorney*—Charles W. Helzer and Thomas E. Beall, Jr.

[57] ABSTRACT

A controlled environment chamber for plant husbandry that is provided with a readily removable sealing top having therein separately sealed light source chamber containing incandescent and fluorescent lights. A control chamber is adjacent to the growing chamber and covered by the top for containing therein a fluid and electrical control circuit for energizing the lights in a timed cycle, individually manually controlling the lights, providing for the introduction of pressurized carbon dioxide into a control volume and simultaneously venting the growing chamber to the outside environment air when the lights are de-energized, discharging the carbon dioxide from the control volume into the growing chamber and simultaneously closing the vent when the lights are energized, and thermostatically controlling only the incandescent light for controlling the temperature within the growing chamber. The fresh air vent valve is spring closed and opened by means of an expansible chamber directly connected to the carbon dioxide control volume. The mixture of carbon dioxide within the growing chamber is controlled by means of a pressure regulator, and a pressure gauge determining the pressure within the control volume and indicating parts of carbon dioxide within the control volume per million parts of gas within the growing chamber. A motor drives one fan to provide circulation within the growing chamber, and another fan to circulate cooling air through the control chamber, light source chamber and through the open vent. Removable slats are provided in the bottom of the growing chamber above a nutrient filled tank for supporting plant containers.

31 Claims, 5 Drawing Figures

INVENTOR
MERTON ALLEN

BY Charles W. Helzer
ATTORNEY

INVENTOR
MERTON ALLEN

BY Charles W Helzer
ATTORNEY

INVENTOR
MERTON ALLEN

BY Charles W. Helzer
ATTORNEY

CONTROLLED ENVIRONMENT APPARATUS AND PROCESS FOR PLANT HUSBANDRY

BACKGROUND OF THE INVENTION

In 1949, a "phytotron" was opened at the Earhart Plant Research Laboratory at the California Institute of Technology, in Pasedena, California to study the growth of plants within a controlled environment. Since that time, similar types of controlled environment apparatus have been built primarily as research tools in the study of plant growth. These devices have controlled temperature, humidity, circulation, carbon dioxide, and light. The results obtained with such controls are quite startling, but the devices have not been suited for small operations, particularly use within the home.

The prior art devices of this type have been particularly cumbersome with respect to the complicated controls and expense of equipment. Further, they have required considerable maintenance and supervision. It is an object of the present invention to overcome these disadvantages so that an economical unit may be provided for small volume usage, particularly within the home and small volume experimental use.

SUMMARY OF THE INVENTION

The apparatus according to the present invention comprises a closed growing chamber having one wall provided by a removable section. Preferably, two or three side walls of the growing chamber are glass to provide observation of the growing plants. A liquid nutrient tank is formed in the bottom of the growing chamber for feeding nutrients through wicks to plant containers located on parallel wooden slats immediately above the nutrient. Adjacent the growing chamber, there is additionally provided a separate substantially sealed control chamber, which is also covered by the top.

Carbon dioxide is provided to the growing chamber by means of a standard pressurized carbon dioxide cylinder feeding carbon dioxide gas through a pressure regulating valve and a three-way control valve into a control volume chamber. The pressure within this control volume is determined by a suitable gauge for indicating the parts of carbon dioxide within the control volume per million parts of gas within the growing chamber. This indication is read on a control panel visible from the outside of the apparatus, which panel has a manual actuator for adjusting the pressure regulator to provide for the desired parts of carbon dioxide gas per million parts of gas within the growing chamber. The three-way valve is actuated to discharge the carbon dioxide from the control volume into the growing chamber when the lights are energized and to introduce carbon dioxide from the pressurized container into the control volume when the lights are de-energized. A suitable solenoid is provided for this purpose and connected in electrical circuit with the lights.

Outside environment air is provided through a vent valve located in the wall between the control chamber and the growing chamber. The vent valve is actuated by means of an expansible chamber device spring-urged in the closed direction of the vent valve and expansible in the open direction of the vent valve. The working chamber of the expansible chamber device is directly fluid connected to the carbon dioxide control volume. Thus, when the control volume is filled with carbon dioxide, the expansible chamber device will be actuated to open the fresh air vent; this will happen when the lights are de-energized so that fresh air will be provided to the growing chamber when the lights are off. Correspondingly, when the carbon dioxide control volume is connected by the three-way valve to the growing chamber for discharging carbon dioxide into the growing chamber, the working chamber of the expansible chamber device will be connected to the growing chamber so that the spring will close the vent valve and substantially seal the growing chamber with respect to the outside; thus, carbon dioxide will be introduced into the sealed growing chamber when the lights are turned on.

The control circuit within the control chamber provides for energizing both the incandescent lights and the fluorescent lights under the influence of a manually adjustable timer for automatic cycling. In series with each of the incandescent lights and fluorescent lights is a separate electrical switch for separate manual control of the incandescent lights and separate manual control of the fluorescent lights. Further, a thermostat is in electrical series only with the incandescent lights so that the incandescent lights, in addition to providing a particular spectrum of light for plant growth, provide the heat for the growing chamber. Thus, when the temperature within the growing chamber falls below a certain value, the thermostat will close allowing passage of electricity to the incandescent light, provided the timer and manual switch are also closed. For outside air circulation, the control chamber is divided by means of a partition wall so that air may enter through louvers or air vents in the control chamber end at the top, pass downwardly through the outside portion of the control chamber and upwardly through the inside portion of the control chamber to thus cool all of the control elements. This movement of the air is caused by a suitable fan in the control chamber driven by a motor also within the control chamber. This cooling air is discharged from the control chamber upwardly into the top, which top is constructed to provide a sealed chamber for the lights so that the cooling air will travel along and between the lights for exit from louvers or air vents located opposite from the previously mentioned louvers or air vents. When the vent valve is open, this outside fresh air will move from the control chamber into the growing chamber, in addition to the previously described air circuit. A fan is provided for circulating the gas within the growing chamber and is driven by means of the previously mentioned motor within the control chamber. The motor is electrically connected for continuous operation.

The top (or some other side such as the front or back) is constructed as a separate independent unit so that it may be removed or otherwise opened for access to the growing chamber to allow necessary work. The top is further constructed with a partition wall aligned with the partition wall within the control chamber to provide the above-mentioned cooling air flow. The control chamber and top are provided with mating parts of an automatic quick disconnect electrical coupling between the control circuit and lights. Therefore, when the top is removed, the lights are automatically disconnected from the control circuit and when the top is placed in sealing relationship with the remaining structure, the coupling provides electrical connection between the lights and control circuit. With this apparatus an improved growth process is made possible whereby forced growth conditions are provided which maintain high $CO_2$ content, high humidity, high light intensity and an improved plant nutrient mixture.

BRIEF DESCRIPTION OF THE DRAWING

Further objects, features and advantages of the present invention will become more clear from the following detailed description of the drawing wherein.

DETAILED DESCRIPTION OF DRAWING

Figure 1:
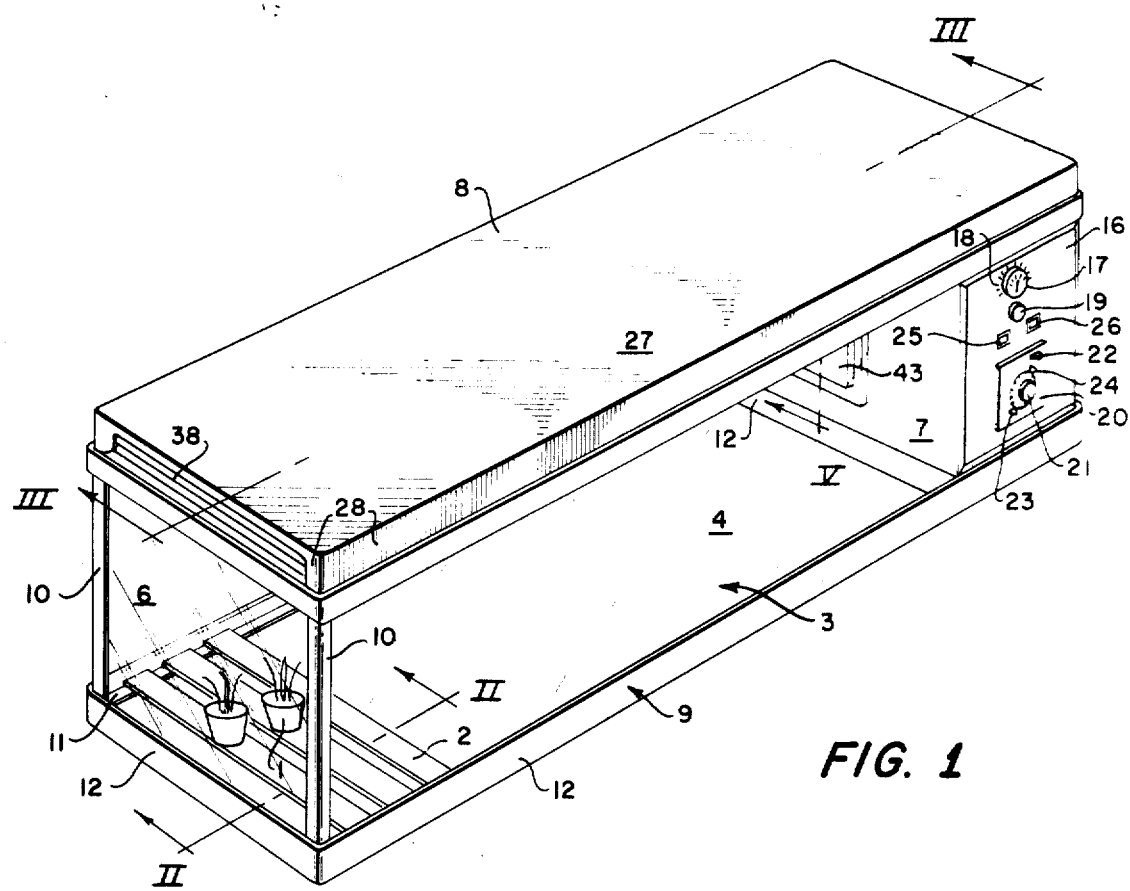
FIG. 1 is a perspective view of the apparatus according to the present invention showing plants within the growing chamber, the top in its sealed position and the various controls on the outside wall of the control chamber.

A controlled environment for plant husbandry is produced by the apparatus shown in FIG. 1, which is a preferred embodiment of the present invention. The temperature, carbon dioxide concentration, light, circulation and fresh air are controlled within a growing chamber.

A plurality of containers 1, for example, flower pots having a central bottom hole, are filled with a suitable soil and the desired plant for placement on a plurality of movable wooden, plastic, metal, etc. boards or slats 2 within a growing chamber 3. The growing chamber is substantially sealed with respect to the outside and formed by a preferably removable front glass wall 4, stationary side glass wall 5, a rear wall 6 that may or may not be glass, a chamber dividing wall 7, a removable top section 8, and a tank-shaped bottom 9 that forms a liquid reservoir. The vertical walls 4–7 are held together in a rigid frame by means of angle-corner pieces 10 that are welded or otherwise rigidly secured to the fabricated sheet metal tank 9, with suitable sealing compounds and materials used to form air-tight joints. While 9 is described as comprising a tank, it is believed obvious that instead it can be designed to support tank-like removable trays, pans, buckets, cans etc. of liquid nutrient for a purpose to be described hereinafter.

Figure 2:
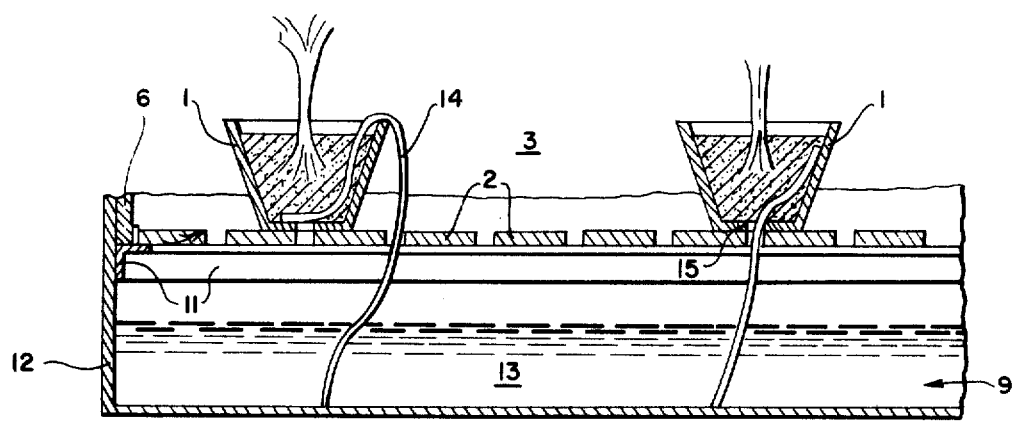
FIG. 2 is a partial cross-sectional view taken along line II—II of FIG. 1 showing the placement of the plant containers on the slats above the liquid nutrient which is supplied to the plants by wicks.

As shown more clearly in FIG. 2, a framework of horizontally extending support members 11 are secured by welding or the like to the four vertical side walls 12 of the tank 9, to support thereon the movable transversely extending, parallel slats 2 as well as the bottom edges of at least some of the walls 4–7. Tank 9 is filled to a level preferably below the slats 2 with a liquid mixture of plant nutrient and water 13. For automatic feeding and watering of the plants, a fibrous wick 14 is arranged to extend from within the nutrient-water mixture in the tank 9 to the soil within associated container 1. For this purpose, a hole 15 is preferably in the bottom of each container 1 to allow passage of the wick 14. The slats 2 are loosely placed on the top of their support members 11 so that the slats 2 may be readily removed for cleaning of the tank 9, adding additional nutrient water mixture, and for providing just enough spacing to allow passage of the wicks 14 while covering the surface of the mixture 13 to the greatest extent for minimizing evaporation and algae formation.

On the far side of the chamber dividing wall 7, as shown in FIG. 1, there is provided a control chamber housing the electric and fluid controls for manually or automatically periodically supplying carbon dioxide to the growing chamber 3, incandescent and fluorescent lights in the growing chamber 3 and fresh air to the growing chamber. These features will be described in more detail with respect to the remaining figures, but are briefly mentioned here with respect to their relationship with the controls shown on the control panel 16.

A pressure gauge 17 is provided with a movable indicator and indicia 18 for indicating the parts per million of carbon dioxide added to the growing chamber 3, which ratio is controlled by means of a pressure regulated control knob 19. The automatic cycling of the apparatus is under the control of a timer 20, which is provided with a central adjusting knob 21 that may be pulled out to stop the timer or pushed in and rotated to set the correct time of day and start the timer; alternately, an on-off switch 22 for the timer or for the entire apparatus may be provided. An On tab 23 and an Off tab 24 are provided on the timer to be set at the respective times for turning on and off the lights automatically; these tabs may be pushed in and rotated to a position where they are aligned with the desired numeral of the clock face carried with the knob 21. The timer may be of conventional construction. For manual overriding of the control for the lights, there is provided a manual electrical switch 25 that will light up when the fluorescent lights are on as called for by the timer 20; thereafter, this switch 25 may be pushed so that it will become dark and turn off the fluorescent lights independently of the timer 20. Similarly, the manual switch 26 is provided to control the energizing of and indicate the lighting of the incandescent lights for the growing chamber 3. While a specific design for the timing control switch has been described, it is to be understood that any suitable form of control for performing the switching functions noted might readily be employed as would be obvious to one skilled in the art.

Figure 3:
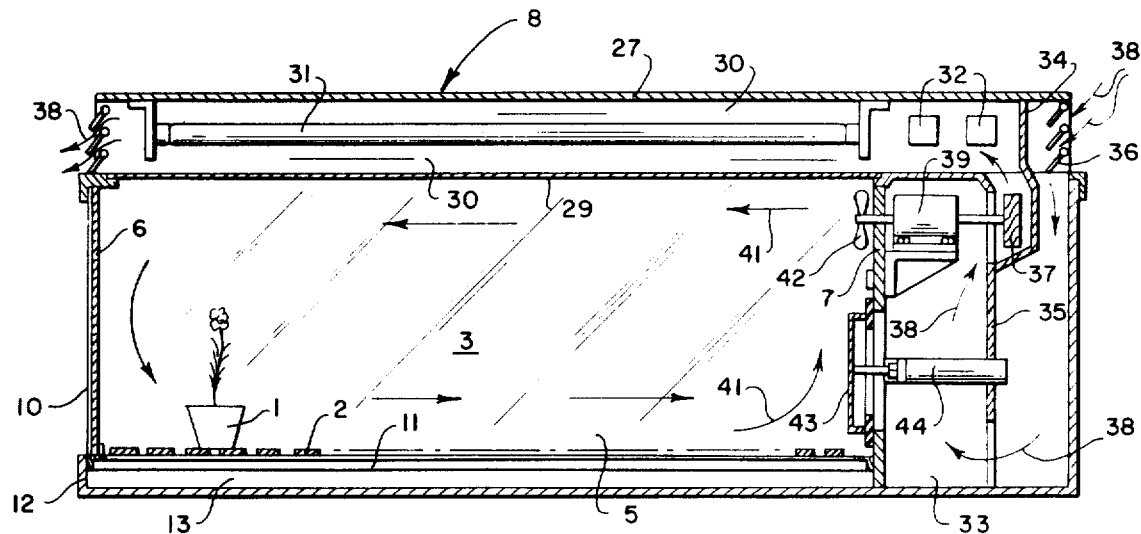
FIG. 3 is a side elevation cross-sectional view taken along line III—III of FIG. 1, particularly showing the flow of gasses within the apparatus when the vent is closed.

In FIGS. 1 and 3 it is seen that the top 8 is provided with a top wall 27, side wall 28 and bottom wall 29, which are all rigidly secured together to form a removable and substantially closed artificial light chamber 30. A plurality of fluorescent lights 31 and incandescent lights (not shown) are operatively mounted within the light chamber 30, preferably by means of hangers attached to the top wall 27, so that the light may shine downwardly through the transparent bottom wall 29 into the growing chamber 3. For replacement of and servicing the lights, the bottom wall 29 is constructed to be removable from the top 8. Also, a plurality of fluorescent light operating ballasts 32 are mounted within the chamber 30.

The control chamber 33 is formed by the top 8, chamber dividing wall 7, and suitable bottom and further side walls. Rigidly attached to the top 8, there is a partition wall portion 34 which aligns with and seals a partition wall portion 35 that is rigid with the walls of the control chamber 33. At the right end as viewed in FIG. 3, that is, the control chamber end of the top 8, there is provided a plurality of louvers or air vent holes 36 that may be stationary or pivotably mounted to swing open under a differential of pressure.

During operation of the apparatus, cooling air continuously enters through the louvers or air vent holes 36 in the top 8, travels downwardly along the outside of the partition walls 34, 35 to the inlet of axial fan 37 for discharge upwardly and to the left into the light chamber 30. This movement of the cooling air, as shown by the arrows 38, will provide cooling for the various electrical controls on the control panel 16 and the electric motor 39, which drives the axial fan 37. As the cooling air moves to the left in the light chamber 30 as viewed in FIGS. 3 and 4, it will cool the ballasts 32, the incandescent lights, and the fluorescent lights 31 before exiting to the left through louvers or air vent holes 40, which louvers 40 are opposite to but otherwise similar to the previously described louvers 36.

To provide circulation within the growing chamber 3 as shown by the arrows 41, an axial fan 42 is mounted within the growing chamber 3 to be driven by the motor 39.

Figure 4:
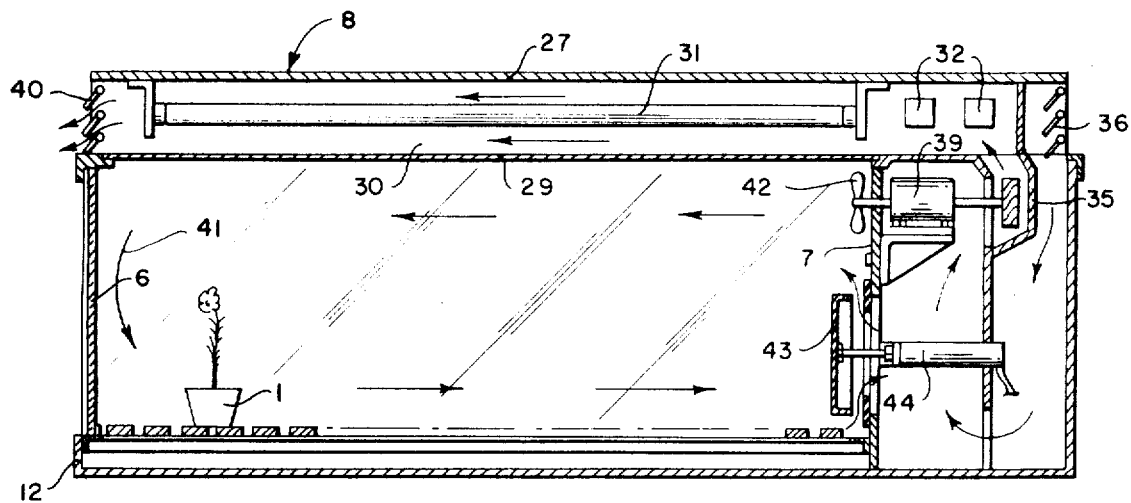
FIG. 4 is a cross-sectional view similar to FIG. 3, but with the vent open.

Fresh outside environment air may be supplied to the growing chamber 3 by means of a vent valve 43, which is shown in its closed position in FIG. 3 and its open position in FIG. 4. An expansible chamber actuator 44 is spring-urged toward the right to close the vent valve 43 and is movable toward the left during expansion of its working chamber to open the valve 43. With the valve open as shown in FIG. 4, the previously described cooling air circuit of FIG. 3 is modified only to the extent that cooling air now also enters the growing chamber 3 for circulation by the fan 42. That is, the growing chamber 3 is sealed with respect to the outside in FIG. 3, but vented to the outside air in FIG. 4.

Figure 5:
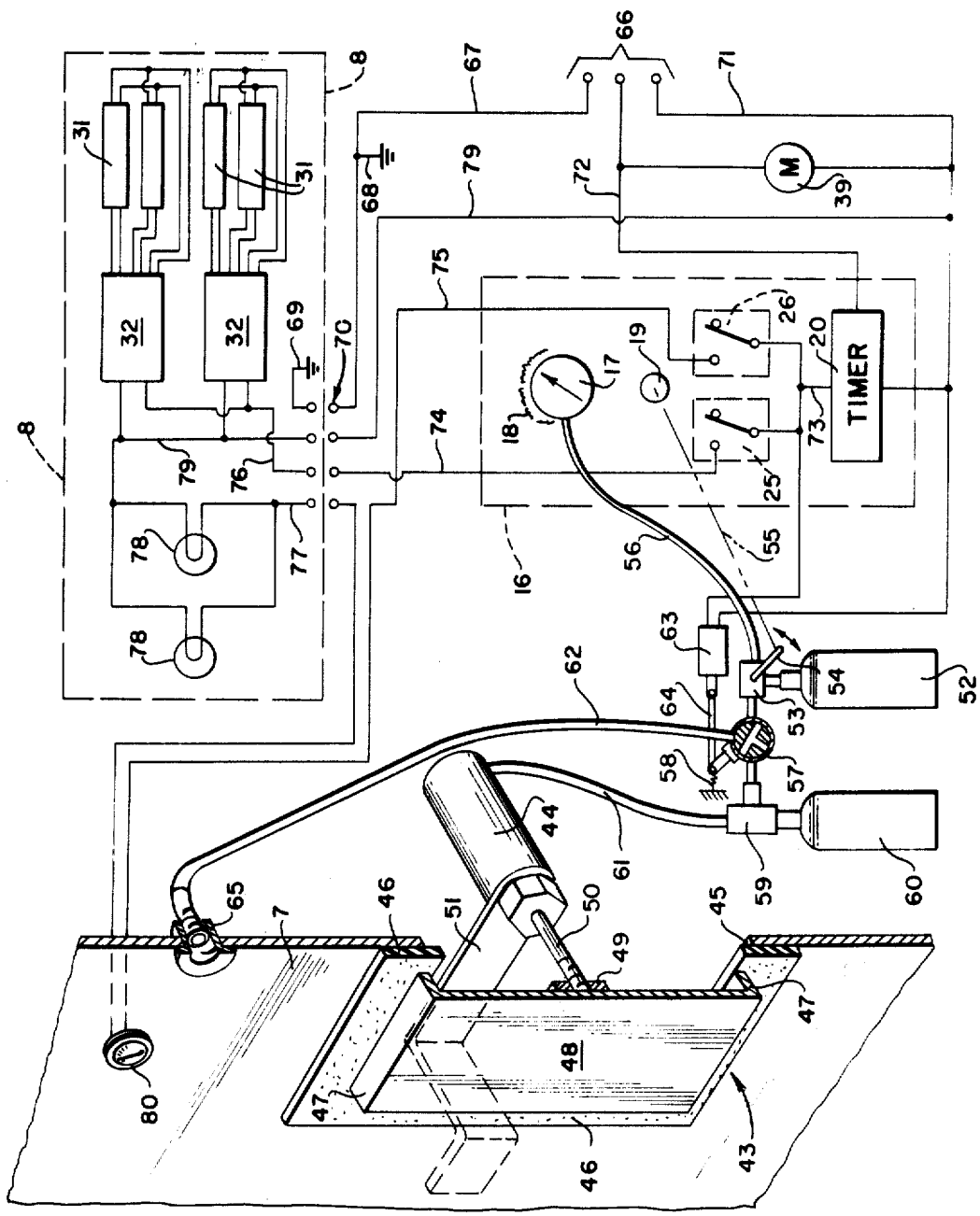
FIG. 5 shows a perspective partial cross-sectional view taken along line V—V of FIG. 1 in conjunction with a somewhat schematic representation of the carbon dioxide circuit and the electrical control circuit.

Further specific details of the vent valve 43 are shown in FIG. 5 wherein it is seen that the valve is formed from a rectangular hole 45 cut in the chamber dividing wall 7 and surrounded by a rectangular ring gasket 46, preferably a closed cell foamed elastomeric material such as rubber, which will engage the rigid sealing lip 47 of the movable valve portion 48, which movable valve portion 48 is rigidly provided with a nut 49 threadably receiving the piston rod 50 of the actuator 44. The actuator 44 is a conventional single acting, spring biased, piston-cylinder arrangement mounted by means of a bracket 51 that is welded or otherwise secured to the chamber dividing wall 7. As will be explained later, the vent valve 43 is operated by the carbon dioxide supplying system so that it will close when carbon dioxide is discharged into the growing chamber and will open when carbon dioxide is not supplied to the growing chamber.

Carbon dioxide is supplied to the growing chamber 3 from a pressurized source, particularly a pressurized container of liquid carbon dioxide 52. A commercially available quick disconnect fluid coupling is directly connected to the container 52 to facilitate changing containers. The discharge pressure of the carbon dioxide from the container 52 is determined by the pressure regulator 53, which is adjusted by means of the lever 54 and schematically shown mechanical linkage 55 extending to the control knob 19 on the control panel 16. The thus adjusted pressure is indicated on the pressure gauge 17 which is fluid connected to the regulator 53 by means of fluid line 56. A three-way valve 57 is normally biased in the counter clockwise direction by means of a spring 58 to provide a direct connection between the regulator 53 and the T-fitting 59 that leads to a control volume chamber 60, so that carbon dioxide will fill the control volume chamber 60 to the pressure determined by the regulator 53 and shown on the pressure gauge 17. Simultaneously, pressurized carbon dioxide will be fed through the fluid line 61 to the working chamber of the actuator 44 to move the piston rod 50 to the left and thus open the vent valve 43. In this position of the three-way valve 57, no pressurized carbon dioxide will be fed through the fluid line 62.

When the lights are energized, the electric control circuit will simultaneously energize the solenoid 63 which will, through the linkage 64, rotate the three-way valve 57 in the clockwise direction to a position wherein the fluid line 62 will be only directly connected to the T-fitting 59 leading to the working chamber of the actuator 44 and the control volume chamber 60. In this position of the three-way valve, the predetermined quantity of carbon dioxide will be fed through the fluid line 62 into the growing chamber 3, which fluid line 62 is secured to the chamber dividing wall 7 by means of a suitable coupling 65. Thus, it is seen that the working chamber of the actuator 44 is vented to the substantially atmospheric pressure of the growing chamber 3 so that its internal spring (not shown) will move the piston rod 50 to the right to close the vent valve 43 and seal the growing chamber 3 for retention of the carbon dioxide within the growing chamber 3.

Since the volume occupied by the fluid line 61, T-shaped fitting 59, control volume chamber 60 and working chamber of the actuator 44 are known along with the effective volume of the growing chamber 3, the correlation between the pressure as indicated by the gauge 17 and the parts of carbon dioxide per million parts of gas within the growing chamber 3 is readily determined and incorporated in the indicia 18 associated with the pressure gauge 17, so that the parts per million may be read directly from the gauge 17 on the control panel 16. Thus, the control knob 19 will adjust the concentration of carbon dioxide. In addition, if a desired concentration cannot be obtained on the gauge 17 by means of manipulating the knob 19, this will indicate mOst usually that the carbon dioxide container 52 is empty.

The electrical control circuit for the apparatus of the present invention as shown in FIG. 5 operates from a standard grounded three-prong 120 volts, 60 cycle, AC, household outlet, with the power plug being schematically illustrated at 66. The ground line 67 of the plug is connected to the growing chamber case at 68, and the top case at 69. Electrical connection between the top 8 and the control chamber 33 is formed by means of a conventional quick disconnect coupling 70 that will be automatically disconnected when the top 8 is removed from the frame formed by the control chamber 33, vertical walls 4-7 and corner pieces 10; similarly, the electrical connection will be automatically made by the coupling 70 when the top is replaced.

Current is supplied by lines 71 and 72 for continuous operation of the motor 39 and the timer 20. As previously mentioned, the timer 20 is adjusted to turn on the lights for only a set period within each 24 hours, so that current will be supplied to the timer output 73 only within this period.

With current in line 73, the solenoid 63 is actuated to move the three-way valve 57 to a position for discharging the carbon dioxide from the control volume chamber 60 through fluid line 62 into the growing chamber 3 and simultaneously venting the actuator 44 to close the vent valve 43. Assuming that the manual switches 25, 26 are in their closed position, (their open position is illustrated in the drawing), current will be carried from the timer output 73 through switches 25, 26 and lines 74, 75 respectively, to the disconnect coupling 70 for respective connection to the top lines 76, 77, to respectively supply current to the parallel connected incandescent lamps 78 and the parallel connected ballasts 32. Current is returned from the incandescent lights 78 and ballasts 32 by means of the common line 79 through the disconnect coupling 70 to the power plug line 71. In a conventional manner the ballasts 32 will operate the fluorescent lights 31 when energized.

However, it is seen that a thermostat 80, which is mounted on the chamber dividing wall 7 to sense the temperature within the growing chamber 3, is connected in the line 75 to be in electrical series between the timer 20 and only the incandescent lights 78, that is, not the fluorescent lights. In this manner, the incandescent lights are used to control the temperature within the growing chamber 3. This is accomplished in that when the timer is calling for the lights to be on, the incandescent lights will be on only when the temperature is below a certain maximum pre-set temperature. Further control of the lights is seen from the series positioning of the manual switches 25, 26, that is, when the timer is calling for the lights to be on, the switch 25 may be manually actuated to turn off the fluorescent lights and/or the switch 26 may be manually actuated to turn off the incandescent light.

The above details of construction are preferred even though many modifications, variations and embodiments are contemplated within the broader aspects of the present invention, with the scope of the invention being determined by the claims. Most preferably, the overall size will be about 15 inches wide, 46 inches long and 22 inches high, with a growing chamber about 14 inches wide, 40 inches long and 16 inches high. Two 40 watt incandescent lights and four 30 watt fluorescent lights have been found to be most satisfactory. The carbon dioxide system is constructed to provide any concentration within the range of 500 to 6,000 parts per million above normal atmosphere and the timer can provide light periods of 1–23 hours each day.

OPERATION

The apparatus of the present invention is specifically designed for use in the home or other small plant growing operation. Operation is completely automatic, unless the user desires to use the manual over-rides for experimentation and the like.

The unit is turned on by plugging the power cord into a standard household three-prong grounded 120 volt AC outlet. In a like manner, the entire unit may be turned off by merely unplugging.

The top may be removed to fill the tank in the bottom with liquid nutrient, which would preferably have a balanced mixture of nitrogen, potassium, phosphorus in a normal 20—20—20 mix to provide the required micronutrients to sustain plant growth at the accelerated rate combined with algicide (copper sulfate) and hormones in the form of chemical enzymes to promote growth in high carbon dioxide environment. The added enzymes cause the stomatal pores of the leaf structure to open up for accepting the high concentration of carbon dioxide. Otherwise, pores normally would tend to close under increased carbon dioxide and temperature. The enzymes further generate production of new chlorophyl, prevent degradation of existing chlorophyl, delay the onset of senescence in leaves, and to promote protein formation. A chelating agent may be added to keep the blend in solution.

The removable wooden slats are placed in position to provide for maximum coverage of the liquid nutrient and to prevent excessive evaporation during venting and algae formation, while allowing sufficient space between the slats to extend the wicks from the liquid nutrient to the plant containers. Preferably, plant containers with a bottom hole would be used. With the growing chamber sealed by the vent valve, the humidity will be close to saturation, which will prevent damage that would otherwise occur to the leaf structure under conditions of high carbon dioxide content and temperature. The adaptability of the present device is shown in that the slats may be removed not only to service the bottom of the tank but also to allow placement of plant containers directly within the nutrient solution, if desired, instead of on top of the slats. Thereafter, the top is reassembled on the apparatus (or alternatively a front, back or side opening is closed if access is provided in such manner) with automatic coupling between the lights and the electrical control circuit taking place along with sealing of the growing chamber.

The cycling of the lights is accomplished by pulling out the center knob of the timer and rotating the knob to indicate the correct time of day; thereafter, the knob is pushed back in to start the timer. The time at which the lights are to come on is set by pressing in the ON tab and rotating it to the desired time. Correspondingly, the time for the lights to be de-energized is set by pushing in the OFF tab and moving it to the desired time. The majority of plants will respond best to a light period of 14 to 16 hours. However, this light period may be set by the operator for any desired range for experimentation and to match the conditions within the apparatus to best grow a particular plant species. Except for experimentation, no further adjustment of the timer is necessary and the timer will automatically turn the lights On and Off at the desired times for continuous operation from day to day.

The automatic operation of the timer may be manually over-ridden if desired to provide particular effects. The fluorescent lights will produce a light strong in the blue wave lenths, which will grow short, bushy plants; the incandescent lights will provide a light strong in the red wave lengths, which will produce relatively tall and spindly plants. Normally, both fluorescent and incandescent lighting is desired since most plants require simulation of both the blue and red wave lengths of natural daylight. However for experimentation and special effects, the manual light switches on the control panel may be operated. During normal automatic operation of the apparatus, the two manual switches on the control panel will be illuminated to indicate that they are on when the timer is calling for light and will be dark to indicate that they are off when the timer has de-energized the lights. If it is desired to turn off either or both of the incandescent and fluorescent lights during the normal On period of the lights, it is merely necessary to push the corresponding switch or switches until they are darkened to indicate that their respective light is Off. The left hand switch on the control panel being used to manually control the fluorescent light, while the right hand switch on the panel is used to control the incandescent light.

The carbon dioxide concentration within the growing chamber may be controlled within a wide range to provide the desired effects with respect to plant growth. Normal range of operation is 500 to 2,000 parts of carbon dioxide per million parts of gas within the growing chamber above the normal atmosphere concentration of roughly 300 parts per million. The United States Department of Agriculture has made test showing that a level of 1,000 to 2,500 parts per million will ordinarily result in optimum growth for most plants.

The desired concentration of carbon dioxide is obtained by turning the regulator knob on the control panel until the control panel gauge needle registers with the desired parts per million setting on the indicia. Rotation of the regulator knob will correspondingly adjust the pressure regulator in the line between the carbon dioxide tank and the control volume for adjusting the pressure within the control volume when carbon dioxide gas is introduced into the control volume. Due to the automatic operation of the apparatus, carbon dioxide will thereafter be introduced into the growing chamber in the preset concentration each time that the lights are turned on, which will usually be once every day.

Here again, the apparatus is set up for completely independent automatic operation but may be adjusted within a wide range for special effects. The carbon dioxide concentration will to a great extent determine the foliage growth and its effect will be different for different types of plants. Higher levels of concentration should be used for plants with a great deal of foliage or for a crowded growing chamber, and correspondingly less concentrations of carbon dioxide should be used for plants with a small amount of foliage or when only a few plants are in the growing chamber. Ordinarily, carbon dioxide levels above 2,500 parts per million should not be used.

If for some reason, it is necessary to unseal the growing chamber while the lights are on, for example for the removal or tending Of plants therein, it will be desirable to replenish the carbon dioxide that has escaped when the cover is off. This may be done by manipulating the timer on-off switch to turn off the timer and thereafter turning it back on after the cover has been replaced, which will have the effect of de-energizing and energizing, respectively, the solenoid controlling the three-way valve to correspondingly introduce carbon dioxide into the control volume and discharge it later into the growing chamber.

Normally, the thermostat will be set to provide for temperatures within the range of 90° to 95° F. when the lights are on, which setting may be adjusted to a known manner. Thus, the incandescent lights will be turned on automatically whenever the temperature drops below about 90° F. The incandescent lights will be the prime source of heat for the growing chamber, because they provide a large amount of radiation in the far red region. The fluorescent lights will be unaffected by the thermostat operation. Excess heat from the lights will be removed by the environment air circulation as shown in FIGS. 3 and 4. The manual switches on the control panel may be used to over-ride this automatic operation with respect to either the fluorescent or the incandescent lights, without affecting the carbon dioxide cycle as determined by the timer. Even the automatic operation of the lights, vent and carbon dioxide may be altered by merely pulling out the center knob of the timer, without affecting the circulation of air as shown in FIG. 4. As mentioned previously, the entire unit may be closed down by disconnecting the plug from the standard outlet. The commercially available, quick connect and disconnect coupling provided for the carbon dioxide pressurized cylinder facilitates easy and fail-safe replacement of the $CO_2$ cylinder. Normally, the $CO_2$ cylinder will be replaced only about every six months.

During the growth process, flow of water takes place up the plant structure (from the soil through the roots, stem and leaves to the atmospheric air) and carries along the elements necessary for healthy growth from the nutrients in the soil and the nutrients added to the soil in the form of fertilizer chemicals. The adsorption of $CO_2$ from the surrounding air, and the loss of water from the plant to the surrounding air occurs through the stomatal pores located on the surface of the leaves. The stomatal pores have the ability to open and close to admit more or less $CO_2$, or concurrently to transpire more or less water. The stomata are knOwn to open and close in response to the level of $CO_2$ in the surrounding environment. $CO_2$ levels below normal (below about 300 parts per million) (ppm) cause the stomata to open, whereas $CO_2$ levels above normal cause the stomata to close. A closed, or partially closed stomata causes an increased resistance to the passage of $CO_2$ into the plants, thus reducing the full benefit to be derived from growing plants under increased $CO_2$ levels in the controlled environment. The improved process made available by the invention combats the natural tendency for the plants to close its stomata under high $CO_2$ concentrations in the gaseous atmosphere by use of the added hormone chemical that is part of the recommended nutrient preparation.

The recommended nutrient preparation is a special material containing the normally required nutrients of nitrogen-potassium-phosphorus (N–K–P) in for example a 20—20—20 mix or some other suitable mix such as 10—10—10 with an added algicide such as copper sulfate to reduce algae formation under the intense artificial lighting and high humidity conditions of the controlled environment, and with added hormones to cause the plant to open its stomatal pores in order to obtain full benefit from the added-high concentration of $CO_2$ in the atmosphere of the controlled environment. This product, while designed primarily for use in the controlled environment conditions described herein also can be used under more normal growth conditions where a high humidity and available source of water can accommodate for the additional transpiration of plants fed the improved nutrient preparation. Hence, the improved nutrient can also be fed to plants not grown under the forced conditions, provided, however, the plants are wick fed or otherwise supplied from a large water source so that the soil is kept wet to prevent the increased transpiration from robbing the plant of its water. Even under these conditions, the improved nutrient preparation can result in larger and more healthy plants.

One known recommended formulation for the improved plant nutrient mixture is as follows:

| | |
|---|---|
| Commercial plant food (N–K–P), (20—20—20) | 2 g. |
| Kinetin | 2.5 mg. |
| Copper sulfate | 4.0 mg. |

This mixture is dissolved in 1 gallon of water and used to feed plants grown in the controlled environment at elevated $Co_2$ levels. The copper sulfate is added as an algicide to minimize the growth of algae at the high humidity and high light intensity found in the controlled environment, and is quite successful.

Tests were made with the above formulation in the controlled environment herein described, at high $CO_2$ levels using the improved nutrients with algicide in connection with certain test plants, and using only commercial plant food with algicide on other control plants. The results of the tests are set forth below.

| | | Control at High $CO_2$ | Test at High $CO_2$ (Kinetin Added) | Ratio Test/Control |
|---|---|---|---|---|
| Wet weight g. | 9 Day Results | 0.6397 | 1.0106 | 1.55 |
| Dry weight g. | | 0.0473 | 0.0846 | 1.79 |
| % Dry weight | | 7.4 | 8.4 | 1.15 |

The plants fed with the improved nutrient were demonstrated to be 55 percent heavier, had 79 percent greater dry weight and had a 15 percent greater dry weight percent than did the plants which were not supplied with the improved nutrient. In addition, plants were grown under ambient atmosphere conditions using the improved hormone-nutrient-algicide mixture with wick feeding from a large reservoir to prevent plant dying. These plants were compared to control plants grown under similar conditions and fed the same nutrient and algicide but with no hormones added. The plants supplied with the improved nutrient did exceptionally well and grew at least twice as much as the control plants even under ambient $CO_2$ levels. Accordingly, the addition of the hormone is useful even at ambient $CO_2$ levels provided some means, such as wick feeding, is used to prevent plant dry-up.

From the foregoing description, it will be seen that a new and improved controlled environment apparatus and process for plant husbandry, is made possible by the invention.

What is claimed is:

1. A plant growth affecting gas dosage control apparatus for use with a substantially closed growing chamber having a controlled environment for plant husbandry and a source for providing the gas under a pressure greater than the pressure within the growing chamber, comprising:

a separate pressurizable sealed control volume chamber having an inlet to be coupled with the source of gas and an outlet to be fluid coupled with the growing chamber;

said inlet having first control valve means with a first closed position sealing said control volume chamber and a second open position for selectively introducing gas from the source into said control volume chamber; said outlet having second outlet control valve means with a first closed position sealing said control volume chamber and a second open position for selectively discharging only the contents of said control volume chamber into the growing chamber;

and automatic control means for limiting the gas pressure within said control volume chamber when said second outlet control valve means is in its closed position by opening said first inlet control valve means at gas pressures within said control volume chamber below a predetermined gas pressure and closing said first inlet control valve means at gas pressures within said control volume chamber above said predetermined gas pressure for dosing the growth chamber with a correlated predetermined amount of the gas to establish a desired gas concentration within the growth chamber correlated to the growth chamber volume.

2. The apparatus of claim 1, wherein said automatic control means includes means for adjusting the predetermined gas pressure and indicia means drivingly connected to said means for adjusting so that said indicia means directly reads parts of the dosing gas within said control volume chamber per million gas parts with the plant growing chamber.

3. The apparatus of claim 1, including a pressure gauge downstream from said first inlet control valve means.

4. The apparatus of claim 1, including means for controlling the energizing and de-energizing of an electrically powered artificial light source for prOducing light within the growing chamber; and circuit means opening said first control valve means and closing said second control valve means during the de-energizing of the light source to introduce the dosing gas into the control volume chamber, and further opening said second control valve meanS and closing said first control valve means during the energizing of the light source for discharging the dosing gas from said control volume chamber into the growing chamber.

5. The apparatus of claim 4, wherein said circuit means includes solenoid means in series with said means for controlling the light source and mechanically drivingly connected to each of said control valve means.

6. The apparatus of claim 1, including a vent valve for selectively admitting outside environment air into the growing chamber when open and having a closed position for effectively sealing the growing chamber from the outside environment air; and automatic actuator means for opening said vent valve in response to said second control valve means being closed and for closing said vent valve in response to said second control valve means being open.

7. The apparatus of claim 6, including means for controlling the energizing and de-energizing of an electrically powered artificial light source for producing light within the growing chamber; and circuit means opening said first control valve means and closing said second control valve means during the de-energizing of the light source to introduce the dosing gas into the control volume chamber, and further opening said second control valve means and closing said first control valve means during the energizing of the light source for discharging the dosing gas from said control volume chamber into the growing chamber.

8. The apparatus of claim 6, wherein said actuator means includes a power cylinder means, spring biased to close said vent valve and having a working chamber expansible to open said vent valve; and said working chamber being in direct fluid communication with said control volume chamber.

9. The apparatus of claim 6, including a closed light chamber having artificial lights and a light passing wall for fluid separating the light chamber from the growing chamber; and blower means for circulating outside environment air through said light chamber when said vent valve is closed and for circulating outside environment air through said vent valve into the growing chamber and through said light chamber when said vent valve is open.

10. The apparatus of claim 9, wherein said blower means includes a driving motor, a fan within the growing chamber for circulating air around the growing chamber and being drivingly connected to said blower means motor.

11. The apparatus of claim 10, wherein said light chamber is a separate module top to be readily removable as a unit for providing access downwardly into the growing chamber for the removal of and care of plants therein.

12. A method for controlling the supplying of carbon dioxide gas to a substantially closed plant growing chamber, comprising the steps of: filling a separate container with substantially only carbon dioxide gas to a predetermined pressure substantially greater than the gas pressure within the plant growing chamber by withdrawing carbon dioxide gas from a source of carbon dioxide; and venting the thus filled container to the plant growing chamber while simultaneously interrupting gas communication between the container and the source.

13. The method of claim 12, including the step of adjusting a pressure regulator valve to establish the predetermined pressure as correlated to the ratio of volumes between the container and plant growing chamber to obtain a desired parts per million of carbon dioxide dosage greater than 500 above the normal carbon dioxide level within the plant growing chamber for a single filling and venting of the container.

14. Apparatus for use with a substantially closed plant growing chamber having a controlled environment for plant husbandry, comprising:

a fluorescent light and an incandescent light for directing light into the growing chamber;

a thermostat to be responsive to the temperature within the plant growing chamber; and an electrical circuit having means for actuating both said lights, and separate means having only said incandescent light in series with said thermostat for actuating only said incandescent light only when the temperature within said growing chamber falls below a predetermined temperature independently of said means for actuating both said lights.

15. The apparatus of claim 14, wherein said incandescent and fluorescent lights are in parallel within said electrical circuit; and said electrical circuit including a manually controlled electrical switch in series with said incandescent light and a manually controlled electrical switch in series with said fluorescent light.

16. The apparatus of claim 15, including a manually adjustable timer in series with the electrical unit comprising said fluorescent light, said incandescent light, said thermostat and said manually controlled electrical switches.

17. The apparatus according to claim 14, including a manually adjustable timer in series with the electrical unit comprising said fluorescent and incandescent lights, and said thermostat.

18. The apparatus according to claim 17, including carbon dioxide means actuatable to release a predetermined amount of carbon dioxide into said growing chamber;

said electrical circuit including control means in series with said timer for actuating said carbon dioxide means in response to energizing said lights.

19. Apparatus having a controlled environment for plant husbandry, comprising:

a substantially closed plant growing chamber having a sealing top;

said top forming a second substantially closed light chamber fluid separate from said plant growing chamber, but in light communication therewith;

an artificial light within said top light chamber;

an electrical control circuit for having a timer means for controlling the operation of said artificial light;

said light including an incandescent light and a fluorescent light; and said control circuit including a thermostat within said growing chamber in electrical series between said timer and only said incandescent light of said artificial light.

20. The apparatus of claim 19, wherein said control circuit includes separate manual electric switches respectively for said incandescent light and said fluorescent light in series between said timer and said respective lights.

21. The apparatus of claim 19, including vent valve means for admitting outside environment air to said growing chamber in response to de-energizing said light; and means for admitting a predetermined amount of carbon dioxide into said growing chamber in response to energizing said light and simultaneously closing said vent valve means for sealing said growing chamber.

22. The apparatus of claim 19, wherein said growing chamber includes means forming a reservoir for containing liquid nutrient at the bottom thereof;

supports on opposite sides of said means forming a reservoir, and a plurality of parallel removable slats received on said supports and extending between said opposite sides for holding thereon a plurality of plant containers while allowing wick communication between the containers and the nutrient within the reservoir.

23. The apparatus of claim 19, including a sealed control chamber separate from said light compartment and said growing chamber;

said top having vent holes at the control chamber end and the opposite end;

said top and said control chamber having aligned partition wall means parallel with the division between said control and growing chambers, and providing a fluid passage for outside environment air through said control chamber end louvers only downwardly into said control chamber on the outside of said partition wall means and upwardly through said control chamber along the inside of said partition means;

vent valve means in the wall separating said growing chamber and said control chamber for opening to the outside environment air on the inside of said partition wall means; and fan means for drawing air from adjacent the inside of partition wall means and discharging it upwardly into said top light chamber for travel along and between said lights to exit through said opposite end louvers.

24. The apparatus of claim 23, including an electric motor for driving said fan means and being housed within said control chamber for cooling by the flow of outside environment air as it travels into said fan;

said motor having a shaft extending through the wall between said control chamber and said growing chamber; and a circulating fan within said growing chamber drivingly attached to said motor shaft.

25. The apparatus of claim 19, including cooling means for passing outside environment air through said closed light chamber independently of said growing chamber.

26. A process for improved plant growth employing an improved plant nutrient mixture of commercial plant fertilizer, hormones and an algicide in a controlled environment, said process comprising supplying the improved plant nutrients to plants within the controlled environment while maintaining the relative humidity of the controlled environment atmosphere at high levels near saturation, maintaining the $CO_2$ content of the controlled environment atmosphere at levels in excess of normal ambient value and at some value optimized for particular plants, controlling the lighting and temperature conditions within the controlled environment to provide optimized growth conditions whereby the improved plant nutrient mixture fed to plants within the controlled environment maintains the stomatal pores of plants open so as to maximize $CO_2$ acceptance by the plants under the conditions where the high relative humidity of the controlled environment prevents excessive transpiration by the plants during the forced growth process; and the improved plant nutrient mixture is composed of commercial plant fertilizer having added thereto kinetin in the range from one two-thousandths to one two-hundredths part by weight and from one one-thousandth to one one-hundredth part by weight of algicide.

27. A process according to claim 26, further including venting the controlled environment to the atmosphere during periods of darkness so as to permit the plants to breathe normally under normal ambient conditions where photosynthesis is not occurring as it would occur in the presence of light.

28. A process according to claim 26, wherein the improved plant nutrient mixture is supplied to the plants in liquid form through wick feeding from a suitable reservoir.

29. A process according to claim 26, wherein the improved plant nutrient mixture is used in liquid form at a total nutrient-hormone-algicide mixture concentration of from ½ to 10 grams per gallon of water.

30. A process according to claim 29, wherein the improved plant nutrient mixture is supplied to the plants in liquid form through wick feeding from a suitable reservoir.

31. A process according to claim 30, further including venting the controlled environment to the atmosphere during periods of darkness so as to permit the plants to breathe normally under normal ambient conditions where photosynthesis is not occurring as it would occur in the presence of light.

* * * * *